United States Patent Office 3,105,097
Patented Sept. 24, 1963

3,105,097
PRODUCTION OF ARYL SECONDARY PHOSPHINE OXIDES
James Leonard Willans, Abingdon, England, assignor to United Kingdom Atomic Energy Authority, London, England
No Drawing. Filed Feb. 5, 1962, Ser. No. 171,308
Claims priority, application Great Britain Feb. 9, 1961
2 Claims. (Cl. 260—606.5)

This invention relates to the production of aryl secondary phosphine oxides.

It is well known that the heating together of aromatic hydrocarbons, phosphorus trichloride and aluminium trichloride leads to the formation of the aluminium chloride complexes of aryldichlorophosphines and diarylchlorophosphines by the Friedel-Crafts reaction. The reactions which are believed to occur are as follows:

$$RH + PCl_3(AlCl_3) \rightarrow RPCl_2(AlCl_3) + HCl$$

and $$RH + RPCl_2(AlCl_3) \rightarrow (R_2PHCl) + (AlCl_4)^-$$

where R is an aryl radical.

The isolation of useful products from the aluminium chloride complexes of such a reaction mixture has caused considerable difficulty in the past, and has been the object of much research for over seventy years.

The reaction mixtures have been extracted with hydrocarbon solvents, but poor yields were obtained, usually only the aryldichlorophosphines being extracted, with yields of below 25%. The complexes have also been chlorinated and esterified in some suitable solvent and the respective esters of mono-aryl phosphonic and di-aryl phosphinic acids, isolated, by the following reactions:

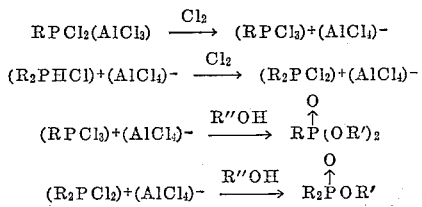

where R" is an alkyl radical. By this procedure a 99% utilisation of hydrocarbon has been claimed in the case of benzene.

More recently good yields have been reported of the secondary phosphine oxides derived from mesitylene, durene and pentamethyl benzene by hydrolysing the corresponding diarylchlorophosphine aluminium chloride complexes of these hydrocarbons with water, by the reaction:

$$(R_2PHCl) + (AlCl_4)^- + H_2O \longrightarrow R_2\overset{O}{\underset{\uparrow}{P}}H + 2HCl + AlCl_3$$

where R is a highly methyl-substituted phenyl radical. Under similar experimental conditions simple aromatic hydrocarbons such as benzene, toluene and ethylbenzene yield no secondary phosphine oxide. Evidence shows that the stability of the diarylphosphine oxides toward oxidizing agents increases with increasing methyl substitution in the benzene ring. From this, it could be implied that the preparation of diarylphosphine oxides from simple aromatic hydrocarbons would be impractical by the Friedel-Crafts method.

It is an object of this invention to provide a method by which aryl secondary phosphine oxides can be simply and inexpensively prepared from simple aromatic hydrocarbons. According to the invention a mixture of one or more aromatic hydrocarbons, phosphorus trichloride or an aryldichlorophosphine, and aluminium chloride, in which there is at least a twice molar proportion of hydrocarbon to phosphorus trichloride or at least an equimolar proportion of hydrocarbon to aryl dichlorophosphine, and there is at least an equimolar proportion of aluminium chloride to phosphorus trichloride of aryl dichlorophosphine, is heated at reflux until the aluminium chloride complex of a diaryl chlorophosphine is produced, the reaction mixture is added to an aqueous acid solution and the diarylphosphine oxide is isolated from the solution. By including different aromatic hydrocarbons, or an aryldichlorophosphine in which the aryl group is different from that derived from an aromatic hydrocarbon in the mixture, mixed diarylphosphine oxides are produced, e.g. by the reactions:

$$RH + PCl_3(AlCl_3) \rightarrow RPCl_2(AlCl_3) + HCl$$

$$R'H + RPCl_2(AlCl_3) \rightarrow (RR'PHCl) + (AlCl)^-$$

$$RH + R'PCl_2(AlCl_3) \rightarrow (RR'PHCl) + (AlCl_4)^-$$

$$H_2O + (RR'PHCl) + (AlCl_4)^- \longrightarrow RR'\overset{O}{\underset{\uparrow}{P}}H + 2HCl + AlCl_3$$

where R and R' are different aryl radicals.

An acid solution is necessary in order to inhibit the formation of extremely stable and intractable complex salts which are otherwise formed between the aluminium and the phosphine oxide compounds, if water alone is used to hydrolyse the aluminium chloride complex. Theoretically, the hydrolysis itself should produce sufficient acid to prevent insoluble aluminium salt formation, but in practice the reaction is so vigorous and exothermic that much of the hydrogen chloride formed is lost to the system.

The secondary phosphine oxide may be immediately extracted from the acid solution into a suitable solvent, e.g. benzene, dried and recovered by distilling off the solvent under reduced pressure.

Suitable acids which may be used to prevent insoluble aluminium salt formation are, for example, hydrochloric acid and sulphuric acid.

Suitable hydrocarbons which may be used in the Friedel-Crafts reaction include benzene, toluene, xylene, ethylbenzene, propylbenzene, butylbenzene, amylbenzene and hexylbenzene.

Suitable aryldichlorophosphines which may be used include the phenyl-, tolyl-, ethylphenyl-, propylphenyl-, butylphenyl-, amylphenyl-, and hexylphenyl-dichlorophosphines.

The following examples are preferred ways of carrying the invention into effect, the parts being by weight.

*Example I*

One part phosphorus trichloride (1 mole), one part aluminium trichloride (1 mole) and 2.25 parts of benzene (3.9 moles) are heated on a steam bath, with the exclusion of moisture for sixteen hours. The reaction mixture is slowly added to 7.0 parts of an aqueous solution of 2.5 N hydrochloric acid. The oily diphenylphosphine oxide is extracted from the aluminium-containing acid solution with 16.0 parts of benzene. The separated benzene solution is dried over anhydrous sodium sulphate and filtered. The solvent is removed from the diphenylphosphine oxide, under reduced pressure, by distillation from a steam bath. A 78% yield of crude deliquescent diphenylphosphine oxide is obtained. The product may be characterised by conversion to its well known and stable oxidation product diphenylphosphinic acid $$(C_6H_5)_2\overset{O}{\underset{\uparrow}{P}}OH$$

M.P. 193—5° C.

Example II 1.307 parts (1 mole) phenyldichlorophosphine ($C_6H_5PCl_2$)

is used in place of the phosphorus trichloride in Example I. The reaction mixture is added to 7.0 parts 2.5 N sulphuric acid. The yield and quality of diphenylphosphine oxide is comparable to that obtained in Example I.

The crude diarylphosphine oxides prepared by the method of this invention may be purified by the method described in copending U.K. application No. 4893/61, U.S. patent application No. 171,306, filed February 5, 1962. Diarylphosphine oxides are useful as intermediates in the production of diarylalkylphosphine oxides as described in copending U.K. application No. 4890/61, U.S. patent application Serial No. 171,307, filed February 5, 1962.

I claim:

1. A method of producing a diarylphosphine oxide in which a mixture of at least one aromatic hydrocarbon, phosphorus trichloride and aluminium chloride, in which mixture there is at least a twice molar proportion of hydrocarbon to said phosphorus trichloride and at least an equimolar proportion of aluminium chloride to said phosphorus trichloride, is heated at reflux until the aluminium chloride complex of a diaryl chlorophosphine is produced, the reaction mixture is added to an aqueous acid solution and the diarylphosphine oxide is isolated from the solution.

2. A method of producing a mixed diarylphosphine oxide in which a mixture of at least one aromatic hydrocarbon, an aryl dichlorophosphine, in which the aryl group is different from that derived from an aromatic hydrocarbon in said mixture, and aluminium chloride, in which mixture there are at least equimolar proportions of hydrocarbon and aluminium chloride to said phosphorus trichloride, is heated at reflux until a mixed diarylchlorophosphine is produced, the reaction mixture is added to an aqueous acid solution and said mixed diarylphosphine oxide is isolated from the solution.

No references cited.